United States Patent

Frazier et al.

[15] 3,645,765

[45] Feb. 29, 1972

[54] CARBON BLACK PELLETING AGENT

[72] Inventors: Arthur E. Frazier; Robert E. Dollinger, both of Borger, Tex.

[73] Assignee: Phillips Petroleum Company

[22] Filed: Nov. 20, 1968

[21] Appl. No.: 777,490

[52] U.S. Cl............................106/307, 23/314, 106/308 F, 106/308 Q, 264/117
[51] Int. Cl..........................................................C09c 1/58
[58] Field of Search..............106/307, 308 F, 308 Q; 23/314; 264/117

[56] References Cited

UNITED STATES PATENTS

| | | | |
|---|---|---|---|
| 2,050,193 | 8/1936 | Park | 106/307 |
| 2,427,238 | 9/1947 | Swart | 106/307 |
| 2,635,057 | 4/1953 | Jordan | 106/307 |
| 2,907,670 | 10/1959 | Katz et al. | 106/308 Q |
| 2,942,997 | 6/1960 | Bram et al. | 106/308 Q |
| 3,094,499 | 6/1963 | Gassmann et al. | 106/308 Q X |
| 3,450,666 | 6/1969 | Nease | 106/308 Q X |
| 3,005,725 | 10/1961 | Daniell | 106/307 |

*Primary Examiner*—James E. Poer
*Assistant Examiner*—H. M. S. Sneed
*Attorney*—Young and Quigg

[57] ABSTRACT

A carbon black pelleting agent which acts as a pelleting agent and which acts to disperse the carbon black in rubber which comprises an aqueous solution of a polyethyoxylated fatty acid.

5 Claims, No Drawings

CARBON BLACK PELLETING AGENT

This invention relates to dispersing agents.

In one of its more specific aspects, this invention relates to pelleting agents having dispersion properties.

Carbon black is generally pelleted prior to bagging for the purpose of simplifying handling. Various agents facilitate the pelleting operation, such agents improving the agglomeration. Generally, these agents have no effect in the rubber in which the carbon black may be subsequently blended as a reinforcing agent.

There has now been discovered a class of compounds which facilitate the pelleting operation and, at the same time, affect the carbon black when blended in rubber. This effect makes these compounds particularly valuable as pelleting agents.

According to this invention there is provided an improved agent for the pelleting of carbon black which comprises an aqueous solution of from about 0.05 to about 5 percent of polyethyoxylated fatty acid.

Accordingly, it is an object of this invention to provide an improved dispersing agent.

It is another object of this invention to provide a pelleting agent for carbon black and for facilitating the dispersal of carbon black in rubber compounds.

The polyethyoxylated fatty acids of this invention have the general formula

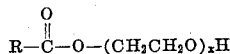

in which $x$, the moles of ethylene oxide, varies from about 5 to about 15. Such fatty acids usually have a molecular weight from about 500 to about 1,000, a specific gravity from about 0.9 to about 1.1 and may be either solids or liquids. The alkyl radical, R, is generally derived from stearic acid, oleic acid, or rosin fatty acids.

Some of the more effective fatty acids are commercially known as Ethofats. Ethofat 60/20, derived from stearic acid, is particularly effective. This compound has an average molecular weight of about 720, contains 10 moles of ethylene oxide, has a specific gravity of about 1, and is a soft paste at 25° C.

Another of these compounds is commercially known as Ethofat 0/15. It contains 5 moles of ethylene oxide; its molecular weight is about 505; it has a specific gravity of about 1 and is a liquid at 25° C. In this compound, the source of the alkyl radical is oleic acids.

Still another of these compounds is Ethofat 242/25 in which there are 15 moles of ethylene oxide, its average molecular weight being about 975, its specific gravity being about 1.08, the material being liquid at 25° C. In this compound the source of the alkyl radical is rosin fatty acid.

Other commercially available Ethofat compounds which have been found suitable are Ethofat 0/20 and Ethofat 142/20.

When compounds such as these Ethofats are used in pelleting, they are added to the carbon black in amounts from about 0.05 to about 5 percent of the weight of the wet pellet prior to drying, the drying removing the principal portion of the moisture incorporated in pelleting. Preferably, the additives are added in amounts from about 0.1 to about 0.75 weight percent of the pellet on a wet basis. Accordingly, the additives will be contained in the final carbon black pellet in an amount from about 0.1 to about 10 percent of the weight of the pellet on a dry basis.

These compounds may be added directly to any medium, such as water, which is used in pelleting the carbon black or may be added with any of the conventional pelleting agents such as molasses, nitric acid and the like. Generally, these additives are effective as a component of any commercial pelleting liquid.

The addition of these compounds can be made directly to the rubber in which the carbon black is dispersed, the dispersing agent then being added in approximately the same percentages as used in the pelleting process. These compounds can be used to pelletize all blacks including channel, furnace and thermal blacks; however, their effect may vary from black to black. These agents particularly facilitate dispersion of those blacks difficult to disperse, that is, the low structure blacks.

In order to evaluate the additives concerned herein, various rubber formulations were made to which were added dried carbon black pellets, pelleted by the use of additives. Evaluations between these additives and other additives were made by the photographic technique described by N. A. Stumpe, Jr. and H. E. Railsback in "Carbon Black Dispersion—Photographic Technique and Rating System," RUBBER WORLD 151, No. 3, 41 (1964). The five standard stocks were mixed in the B-Banbury mixer using the following recipes:

| SBR-1500 | 100 | 100 | 100 | 100 | 100 |
|---|---|---|---|---|---|
| Philrich 5* | 0 | 15 | 30 | 45 | 60 |
| Zinc Stearate | 4 | 4 | 4 | 4 | 4 |
| Flexamine | 1 | 1 | 1 | 1 | 1 |
| Sulfur | 1.67 | 1.92 | 2.17 | 2.42 | 2.67 |
| NOBS Special | 1 | 1.15 | 1.30 | 1.45 | 1.60 |

*Trademark—Philips Petroleum Company

In the above formulation, the styrene-butadiene rubber 1500 (SBR-1500) was a random copolymer rubber, well known in the art. Zinc stearate was used instead of zinc oxide to eliminate any effects of the latter on dispersion. The "NOBS Special" is N-oxydiethylene-2-benzothiazyl sulfenamide.

The Flexamine of the above formulations is a physical mixture comprised of about 65 percent of a complex diarylamine-ketone reaction product and about 35 percent of N,N'-diphenyl-p-phenylenediamine.

In each instance, a carbon black, manufactured by the furnace process, was pressed to a density of about 12 to 13 pounds per cubic foot and pelleted, the additive having been added to the water employed in pelleting to the extent hereinafter indicated. After pelleting, the pellets were dried to water contents from about 0 to about 0.2 part by weight in about 56 parts per carbon black, depending upon the amount of water used in the pelleting process. Normally, the amount of water in the undried pellet, as formed, was from about 30 to about 60 weight percent of the pellet, depending upon the type of black involved.

To prepare the various dispersions, 17½ parts by weight of black were slowly added to 35 parts by weight of each gum masterbatch in a Brabender Plastograph, operated at 30 r.p.m. and 80° C. Addition was completed in about 1 minute after which the ram was inserted in the mixing head and the batch was mixed for about 7 minutes at 70 r.p.m.

The batch was dumped to form a rectangular slab which was cured for 30 minutes under 153° C. The dispersion rating was then determined by the aforementioned photographic method.

Each dispersion was rated by four observers and the results were averaged and plotted, relating rating to the amount of oil added. From each plot, the amount of oil added to give a dispersion rating of 6.6 was read, this rating being intermediate between "good" and "fair," and of acceptable commercial quality, thus being indicative of the amount of oil which could be tolerated in the batch.

Comparative results are shown in Table I below. Each additive has been assigned an "oil tolerance" rating determined by the above method, the higher the oil tolerance rating, the better the dispersion capabilities of the additive.

TABLE I

| Sample Number | Additive | % Additive | Wgt. % water in wet pellet | Oil tolerance rating |
|---|---|---|---|---|
| 1 | None | 0 | 44 | 19 |
| 2 | Ethofat* 60/20 | 0.2 | 44 | 41 |

| 3 | Ethofat* 242/25 | 0.2 | 44 | 36 |
| 4 | Coagulant Aid no. 225 | 0.2 | 44 | 28 |
| 5 | Cat-Floc | 0.05 | 44 | 26 |
| 6 | Cat-Floc | 0.2 | 44 | 29 |
| 7 | Distilled Water | 0 | 52 | 35 |

Coagulant Aid, No. 225: Calgon Corp., Pittsburgh, Pa.

Cat-Floc: Organic Polymeric Cationic coagulant—Calgon Corp., Pittsburgh, Pa.

The above data include results using water for pelleting and using two other commercially acceptable pelleting agents, Cat-Floc and Coagulant Aid No. 225. The oil tolerance rating with water, alone, provides the basis of evaluation. While the commercial agents show a definite improvement in the oil tolerance rating, the use of the polyethyoxylated fatty acids show a still further improvement thereover.

Inasmuch as these data show improved results with distilled or demineralized water, alone, over undistilled water, alone, Samples No. 7 and 1, it is expected that the use of the polyethyoxylated fatty acids in distilled water solutions would show a still further improvement in oil tolerance rating. Similarly, the addition of the polyethyoxylated compound to any pelleting agent which improves oil tolerance rating, would be expected to impart still further improvement to the resulting solution.

While not shown by these data, the use of the additives, in all instances, resulted in carbon black pellets commercially acceptable in all aspects.

It will be understood that various modifications can be made to the invention and its use as disclosed herein. However, such are to be considered as within the scope of the invention.

What is claimed is:

1. A carbon black pelleting agent consisting of water and from about 0.5 to about 5 weight percent of a polyethoxylated fatty acid of the general formula

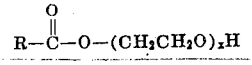

in which R is an alkyl radical derived from one of stearic acid, oleic acid and rosin fatty acid and in which the total moles of ethylene oxide as represented by $x$ is within the range of from about 5 to about 15.

2. The pelleting agent defined in claim 1 in which said fatty acid has a molecular weight in the range of from about 500 to about 1,000.

3. The additive defined in claim 1 in which said fatty acid is present in said agent in an amount in the range of from about 0.05 to about 5 weight percent.

4. Carbon black in pelleted form, said pellet consisting of substantially dry carbon black and the polyethoxylated fatty acid defined in claim 1, said fatty acid being present in said pellet in an amount within the range of from about 0.1 to about 10 weight percent of said carbon black.

5. Carbon black in pelleted form, said pellet consisting of substantially dry carbon black, molasses and the polyethoxylated fatty acid defined in claim 1, said fatty acid being present in said pellet in an amount within the range of from about 0.1 to about 10 weight percent of said carbon black.

* * * * *